US007932904B2

(12) United States Patent
Branets et al.

(10) Patent No.: US 7,932,904 B2
(45) Date of Patent: Apr. 26, 2011

(54) GENERATION OF CONSTRAINED VORONOI GRID IN A PLANE

(76) Inventors: Larisa V. Branets, The Woodlands, TX (US); Xiao-Hui Wu, Sugar Land, TX (US); Santosh K. Verma, Sugar Land, TX (US); Stephen L. Lyons, Spring, TX (US)

( * ) Notice: Subject to any disclaimer, the term of this patent is extended or adjusted under 35 U.S.C. 154(b) by 0 days.

(21) Appl. No.: 12/596,786

(22) PCT Filed: Apr. 2, 2008

(86) PCT No.: PCT/US2008/004282
§ 371 (c)(1), (2), (4) Date: Jan. 29, 2010

(87) PCT Pub. No.: WO2008/150325
PCT Pub. Date: Dec. 11, 2008

(65) Prior Publication Data
US 2010/0128041 A1 May 27, 2010

Related U.S. Application Data

(60) Provisional application No. 60/932,705, filed on Jun. 1, 2007.

(51) Int. Cl.
G06T 17/20 (2006.01)
G06G 7/58 (2006.01)

(52) U.S. Cl. .......................................... 345/423; 703/10
(58) Field of Classification Search .................... 345/953
See application file for complete search history.

(56) References Cited

U.S. PATENT DOCUMENTS

| 5,740,342 | A | 4/1998 | Kocberber | 395/120 |
|---|---|---|---|---|
| 6,018,497 | A | 1/2000 | Gunasekera | 367/72 |
| 6,078,869 | A | 6/2000 | Gunasekera | 702/6 |
| 6,106,561 | A | 8/2000 | Farmer | 703/10 |
| 6,173,075 | B1 * | 1/2001 | Collins | 382/203 |
| 6,373,489 | B1 | 4/2002 | Lu et al. | 345/428 |
| 6,393,159 | B1 * | 5/2002 | Prasad et al. | 382/259 |
| 6,421,052 | B1 | 7/2002 | McGuire | 345/441 |

(Continued)

FOREIGN PATENT DOCUMENTS

WO  WO2005/121840  12/2005

(Continued)

OTHER PUBLICATIONS

Bern et al. Quadrilateral Meshing by Circle Packing. Aug. 2000, International Journal of Computational Geometry & Applications vol. 10, No. 4, pp. 347-360.*

(Continued)

*Primary Examiner* — Jason M Repko
(74) *Attorney, Agent, or Firm* — ExxonMobil Upstream Research Company Law Department

(57) ABSTRACT

A method for generating constrained Voronoi grids in a plane with internal features and boundaries is disclosed. The disclosed method generally includes approximation of internal features and boundaries with polylines based on plane geometry. Protected polygons or points are generated around the polylines, and Delaunay triangulation of protected points or protected polygon vertices is constructed. Delaunay triangulation that honors protected polygons or points is generated in the rest of the gridding domain. The constrained Voronoi grid is then generated from the Delaunay triangulation, which resolves all of the approximated features and boundaries with the edges of Voronoi cells. Constrained Voronoi grids may be generated with adaptive cell sizes based on specified density criterion.

8 Claims, 16 Drawing Sheets

U.S. PATENT DOCUMENTS

| | | | |
|---|---|---|---|
| 6,810,370 B1 | 10/2004 | Watts, III | |
| 6,826,520 B1 | 11/2004 | Khan et al. | 703/10 |
| 6,907,392 B2 | 6/2005 | Bennis et al. | 703/10 |
| 6,928,399 B1 | 8/2005 | Watts, III et al. | 703/2 |
| 7,006,959 B1 | 2/2006 | Huh et al. | 703/10 |
| 7,047,165 B2 | 5/2006 | Balaven et al. | 703/2 |
| 7,096,122 B2 | 8/2006 | Han | 702/13 |
| 7,307,629 B2 | 12/2007 | Srivastava et al. | 345/423 |
| 7,382,685 B2 | 6/2008 | Ferber et al. | 367/43 |
| 7,428,514 B2 | 9/2008 | Jin et al. | 706/13 |
| 2005/0093862 A1* | 5/2005 | Boier-Martin et al. | 345/420 |
| 2005/0140670 A1 | 6/2005 | Wu et al. | 345/419 |
| 2005/0273303 A1 | 12/2005 | Flandrin et al. | 703/10 |
| 2006/0235667 A1 | 10/2006 | Fung et al. | 703/10 |
| 2006/0277011 A1 | 12/2006 | Tardy et al. | 703/10 |
| 2007/0058865 A1 | 3/2007 | Li et al. | 382/173 |

FOREIGN PATENT DOCUMENTS

| | | |
|---|---|---|
| WO | WO2008/150325 | 12/2008 |

OTHER PUBLICATIONS

Du et al. Anisotropic Centroidal Voronoi Tessellations and their Applications. 2005, SIAM Journal of Scientific Computing, vol. 26, Issue 3, pp. 737-761.*

Fang et al. Algorithm for Constrained Delaunay Triangulation. May 1994, the Visual Computer, vol. 10, No. 5, pp. 255-265.*

G.J. Filatovs. Delaunay-Subgraph Statistics of Disc Packings. Jan. 1998, Materials Characterization, vol. 40, No. 1, pp. 27-35.*

Joe et al. Duality of constrained Voronoi diagrams and Delaunay triangulations. Feb., 1993, Algorithmica, vol. 9, No. 2, pp. 142-155.*

Beckner, B.L. et al (2001) "EM$^{power}$ : New Reservoir Simulation System", SPE Middle East Oil Show held in Bahrain. Mar. 17-20, 2001 SPE 68116, Society of Petroleum Engineers, Inc.

Boehm, G et al. (1995) "Getting rid of the grid", *65TH Annu. SEG INT. MTG.* (Houston, Oct. 8-13, 1995) *Expanded Tech. Program ABSTR. BIOGR.* pp. 655-658, 1995. (ISSN 1052-3812; Pap. No. PP4.15; 3 refs).

Bohm, G et al. (2000) "3D adaptive tomography using Delaunay triangles and Voronoi polygons", 58$^{th}$ *EAGE Conference—Geophysical Division*, Amsterdam, The Netherlands Jun. 1996, Received Jun. 1999, revision accepted Jan. 2000.

Bowyer, A. (1981) "Computing Dirichlet tessellations", *The Computer Journal*, vol. 24, No. 2, pp. 162-166, 1981.

Branets, L.V. et al (2008) "Challenges and Technologies in Reservoir Modeling", *Commun. Comput. Phys.*, 6 (2009), pp. 1-23.

Chew, L.P., "*Constrained Delaunay triangulation*", Algorithmica, vol. 4, pp. 97-108, 1989.

Cunha, A, et al. (1997) "Automatic boundary sizing for 2D and 3D meshes", AMD-vol. 220 Trends in Unstructured Mesh Generation, ASME, pp. 65-72, 1997.

Du, Q et al (2002) *Grid generation and optimization based on centroidal Voronoi tessellations*, Appl. Math. Comput., v. 133, pp. 591-607, 2002.

Guzman, H. F . et al. (2001) "Automatic unstructured mesh generation around two-dimensional domains described by B-spline curves", *Proceedings of Detc. Asme. Design Engineering Technical Conferences and Computers and Information in Engineering Conference*, vol. 1, Sep. 12, 2001 pp. 395-400 XP008085522.

Hale, D. (2002) "Atomic Meshes—From Seismic Imaging to Reservoir Simulation", 8$^{th}$ *European Conference on the Mathematics of Oil Recovery*—Freiberg, Germany, Sep. 3-6, 2002.

Hu, C. (2006) "Voronoi Cell Based Staggered Grid SH Wave Numerical Simulation", 76$^{th}$ Annual SEG International Meeting (New Orleans, LA, Oct. 1-6, 2006) Technical Program pap. No. SM P1-6, 2006.

Kalbacher, et al (2005) "Development and application of a CAD interface for fractured rock" *Environmental Geology; International Journal of Geosciences*, Springer-Verlag vol. 47, No. 7 May 1, 2005 XP019332265.

Lawson, C.L., (1977) "Software for C1 surface interpolation", Mathematical Software III, 1977, pp. 161-194.

Lohner, R., et al (2000) "Generation of non-isotropic unstructured grids via directional enrichment", *International Journal for Numerical Methods in Engineering* , vol. 49, pp. 219-232, 2000.

Miller, G.L., et al (2003) "When and why Ruppert's algorithm works", *Proceedings of the 12$^{th}$ International Meshing Roundtable*, pp. 91-102, 2003.

* cited by examiner

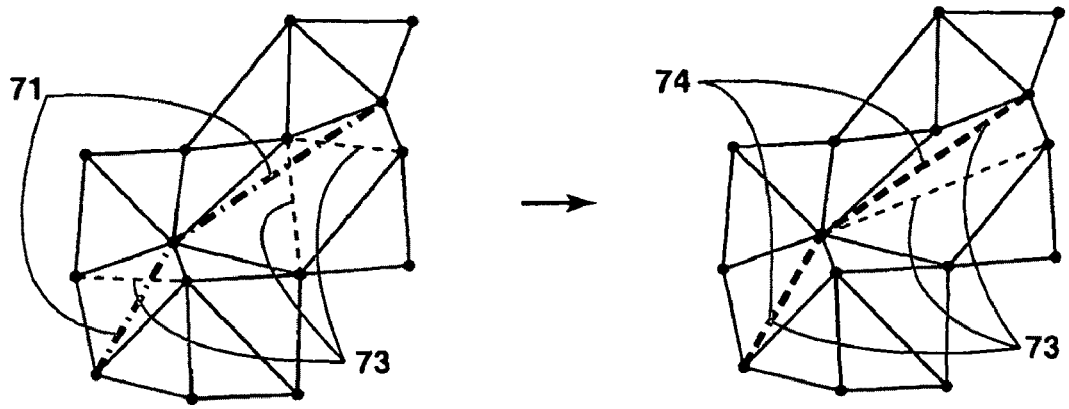
FIG. 3A  FIG. 3B
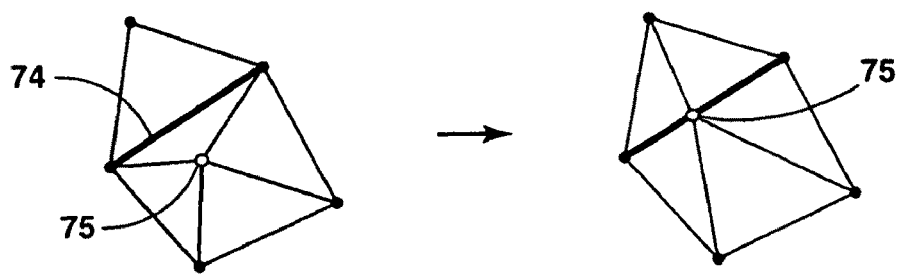
FIG. 4A
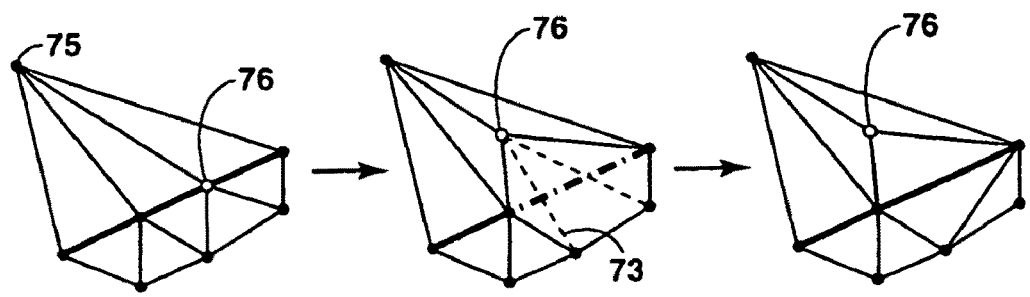
FIG. 4B

GENERATION OF CONSTRAINED VORONOI GRID IN A PLANE

This application is the National Stage of International Application No. PCT/US2008/004282, filed 2 Apr. 2008, which claims the benefit of U.S. Provisional Application No. 60/932,705, filed 1 Jun. 2007.

BACKGROUND

This description relates to the generation of two-dimensional Voronoi grids in bounded regions with internal features. More particularly, this description relates to the use of Voronoi grids in numerical modeling and simulations.

DESCRIPTION OF RELATED ART

A Voronoi cell is defined as the region of space that is closer to its node than to any other node, and a Voronoi grid is made of such cells. Each cell is associated with a node and a series of neighboring cells. The Voronoi grid is locally orthogonal in a geometrical sense; that is, the cell boundaries are normal to lines joining the nodes on the two sides of each boundary. For this reason, Voronoi grids are also called Perpendicular Bisection (PEBI) grids. A rectangular grid block (Cartesian grid) is a special case of the Voronoi grid. The Voronoi grid has the flexibility to represent widely varying domain geometry, because the location of nodes can be chosen freely. Voronoi grids are generated by assigning node locations in a given domain and then generating cell boundaries in a way such that each cell contains all the points that are closer to its node location than to any other node location.

The mesh formed by connecting adjacent nodes of Voronoi cells is commonly called a Delaunay mesh if formed by triangles only. In a two-dimensional Delaunay mesh, the domain is divided into triangles with the grid nodes at the vertices of the triangles such that the triangles fill the reservoir. Such triangulation is Delaunay when a circle passing through the vertices of a triangle (i.e., a circumcircle) does not contain any other node inside it. Several Delaunay triangulation techniques are well known (see, e.g., A. Bowyer, *Computing Dirichlet tessellations*, The Computer Journal, vol. 24, no. 2, pp. 162-166, 1981). Voronoi grids may also be generated from a Delaunay mesh—i.e., a Delaunay triangulation.

Voronoi grids are widely used in industrial fields (e.g., tomography, geological modeling, computational mechanics, superconductors, and fluid dynamics) for numerical modeling and simulations. In particular, Voronoi grids can be used in geologic modeling to store structural and rock property information of a geologic field, as well as in computer modeling of fluid flow in hydrocarbon reservoirs to provide the basis for numerical discretization of modeled flow equations. In practice, Voronoi grids are generated in domains of complex geometry containing internal and boundary geometric features that need to be represented and precisely resolved by the Voronoi grid. Such a matching grid is called a constrained Voronoi grid and it is important for obtaining accurate modeling or simulation results.

One of the drawbacks of existing methods for Voronoi grid generation is their inability to accurately account for the effects of internal features and more particularly, intersections of such internal features. There have been other patented techniques that try to solve the problem of constrained Voronoi grid generation in application to petroleum reservoir simulation. In this application field Voronoi grids are often called perpendicular bisection (PEBI) grids. One of such prior art techniques is by Kocerber (U.S. Pat. No. 5,740,342). This method combines two types of grid generation techniques. It uses triangles and tetrahedra to align along features, represented by polylines, and uses structured quadrilateral/hexahedral grids in the rest of the domain. In the patented technique, solving a fluid flow problem on such a grid involves combining finite-volume and finite-element solution methods. Numerical solutions using such a technique may be unstable and inaccurate (e.g., for multi-phase fluid flow problems).

The technique of Heinemann et al. (Z. E. Heinemann & G. F. Heinemann, *Gridding Techniques for Reservoir Simulation*, Proceedings of the 7th International Forum on Reservoir Simulation, Jun. 23-27, 2003) tries to generate a grid that exactly honors polylines, but fails to be Voronoi in the vicinity of the polyline. The edges (on the polyline) of the Voronoi grid block are not bisectors of the triangle edges. To simplify the flow calculations between the grid blocks, this technique uses pseudo-points on either side of the fault. This simplification makes the flow calculations less accurate.

FIG. 1 illustrates a domain with a polygonal boundary with internal linear features. It originates from a geological structural framework—i.e., a wire-frame representation of the geological structure and faults—of a faulted hydrocarbon reservoir. FIG. 1 shows the top view of the structural framework with projections of the model boundary and fault traces onto the plane of view. Several challenges in generating a constrained Voronoi grid are included in FIG. 1. These challenges include generating a grid that exactly matches the small faults 21, intersection of multiple faults 22, intersection of faults at sharp angles 23, and fault-boundary intersections 24. In an exact constrained Voronoi grid, the features are matched exactly by the boundaries of the Voronoi cells.

FIG. 2 shows an example of a Voronoi grid generated for the structural framework of FIG. 1. The grid was generated using a typical prior art method (such as by D. L. Gunasekera, U.S. Pat. No. 6,078,869). The grid polygons are not exactly aligned along the internal features because the prior art cannot accommodate the challenging features of FIG. 1. Therefore, there remains a need for a method of generating Voronoi grids that more accurately align with internal features.

SUMMARY

This disclosure addresses the problem of generating two-dimensional constrained Voronoi grids that exactly resolve polylinear internal and/or boundary features with the Voronoi cell edges. The constrained Voronoi grids may have adaptive grid cell sizes based on specified density criterion. If features in available geometry description are not polylinear, polylines that trace their location are created. Protection areas, which are formed of protected polygons or points, around such polylines are used to constrain the Voronoi grid. Additional steps, such as grid smoothing, may be used to improve the quality and accuracy of the final Voronoi grid and model based thereon.

In one general aspect, a method for generating a constrained Delaunay triangulation for a planar domain with boundaries and internal features includes approximating the boundaries and internal features of the domain with polylines. Unconstrained Delaunay triangulation is constructed for the domain. The unconstrained Delaunay triangulation is modified to conform triangle sides to the polylines. The modified constrained triangulation is constructed to make it a constrained Delaunay triangulation.

Implementations of this aspect may include one or more of the following features. For example, modifying the unconstrained Delaunay triangulation to conform triangle sides to the polylines may include swapping edges of all triangles intersecting an internal feature. Correcting the modified constrained triangulation to make the constrained triangulation, constrained Delaunay triangulation may include grid smoothing and feature capturing. Correcting the modified constrained triangulation to make the triangulation constrained Delaunay triangulation may include snapping an interior point to a feature segment, moving a point from a feature segment into the interior, repositioning of all points to mass centers of their Voronoi regions, and recursively applying local edge-swap to non-feature edges until all non-feature edges of triangulation are optimal. The grid smoothing may use a given point density distribution.

In another general aspect, a method of generating a constrained Voronoi grid for a planar domain with boundaries and internal features includes approximating the boundaries and internal features of the domain with polylines. Protected polygons are constructed around the polylines. Constrained Delaunay triangulation are constructed having protected polygon sides as constraints in a complement of the protected polygons with respect to the domain. The constrained Voronoi grid is constructed from the constrained Delaunay triangulation.

Implementations of this aspect may include one or more of the following features. For example, the polylines may be based on the geometry of the internal features and a given point density distribution. The construction of protected polygons may include constructing feature polygons from the polylines; constructing polygons from overlapping circles with centerpoints on intersections of polyline segments; and dividing the polygons into Delaunay triangulation. The polylines may be refined to conform to a given point density distribution. The radii of the circles may be determined based on a given point density distribution and/or local geometric features. The Delaunay triangulation may be grid smoothed, and the grid smoothing may be based on centroidal Voronoi tessalations. The Delaunay triangulation may be adapted to a point density distribution.

In another general aspect, a method for generating a constrained Voronoi grid for a planar domain with boundaries and internal features includes approximating the boundaries and internal features of the domain with polylines. Constrained Delaunay triangulation is constructed constrained to the polylines. Protected points are constructed around the polylines from the vertices of the constrained Delaunay triangulation lying on the polylines. New unconstrained Delaunay triangulation is constructed of the set of protected points and interior vertices of the constrained Delaunay triangulation. The constrained Voronoi grid is constructed from the new unconstrained Delaunay triangulation.

Implementations of this aspect may include one or more of the following features. For example, the polylines may be based on the geometry of the internal features and a given point density distribution. The construction of protected points may include replacing each point lying on the feature by a mirror image pair of protected points; and replacing each point lying on a feature intersection by a set of points placed on the circle which is centered at the intersection. The construction of protected points may include adjusting, by estimating projections onto the constrained edges of the constrained Delaunay triangulation, whenever a protection edge estimated from the constrained edge does not satisfy Delaunay condition, and adding protected points formed from the projection points. The polylines may be refined to conform to a given point density distribution. The radii of the circles may be determined based on edge size in the constrained Delaunay triangulation. The Delaunay triangulation may be grid smoothed, and the grid smoothing may be based on centroidal Voronoi tessalations. The Delaunay triangulation may be adapted to a point density distribution.

BRIEF DESCRIPTION OF THE DRAWINGS

FIGS. 3A-B are an illustration of one embodiment of a method for generating Delaunay triangulation that conform to an internal feature utilizing edge swapping as illustrated by the dotted lines.

FIG. 4A-B are an illustration of a feature-capturing technique that is a part of one embodiment of a method for generating Delaunay triangulation conforming to internal features.

FIG. 12 illustrates an example of one embodiment of a method for generating a constrained Voronoi grid.

FIG. 13 illustrates an example of one embodiment of a method for generating a constrained Voronoi grid.

DETAILED DESCRIPTION

Figure 1:
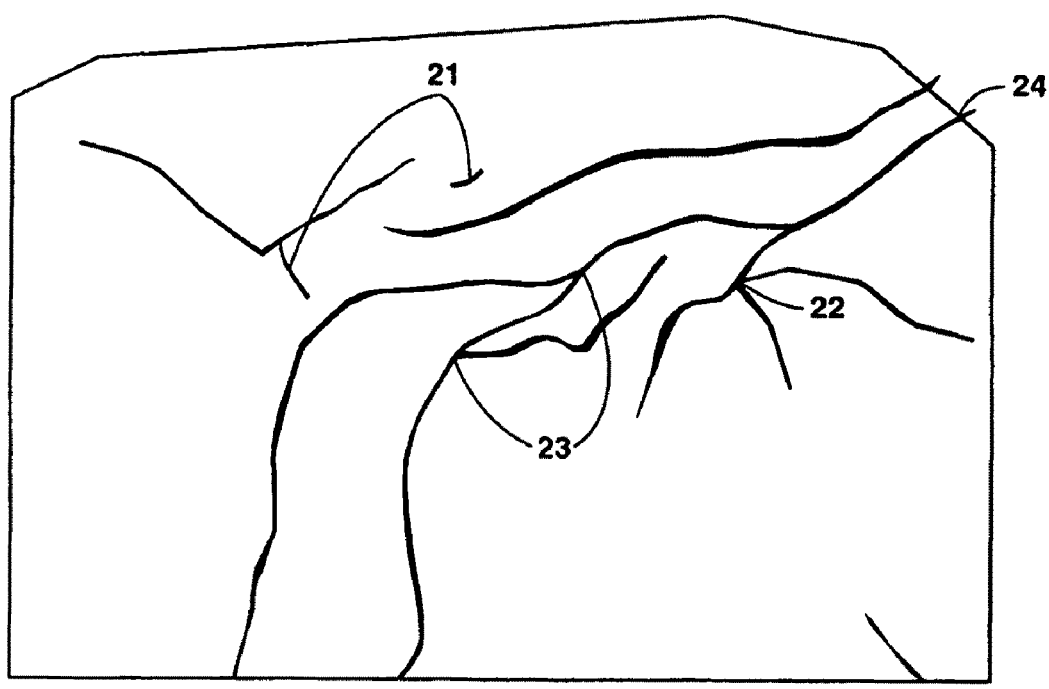
FIG. 1 is a top view of a faulted structural framework.
Figure 2:
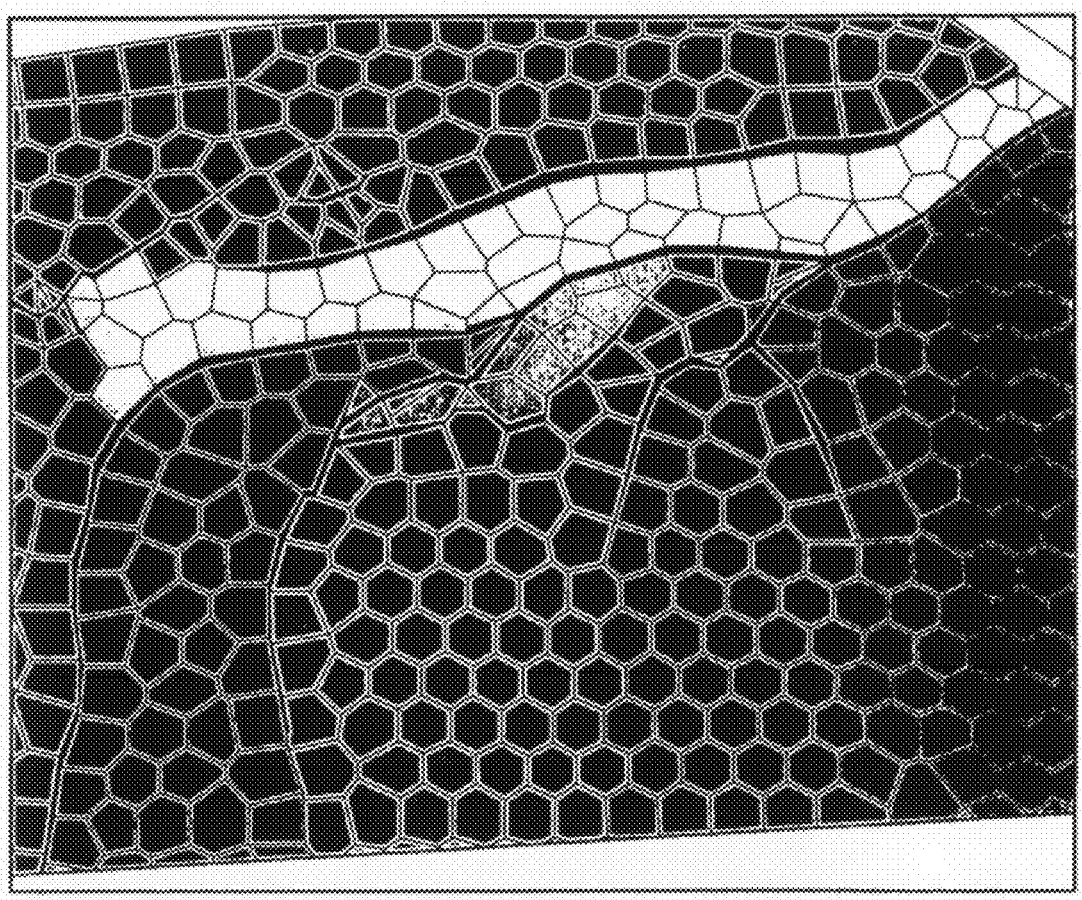
FIG. 2 is a Voronoi grid generated for the structural framework of FIG. 1 using a prior art method.

This disclosure solves the problem of generating two-dimensional Voronoi grids in bounded regions with internal features, which are represented by continuous lines composed of one or more straight line segments (called polylines). In practice, it is desirable that the Voronoi grids match precisely the boundaries and polyline features (i.e., that the grid polygon (cell) borders exactly match the boundaries and features). In preferred embodiments, some or all of the steps are computer-implemented. If a computer is used, the software for carrying out any step in the method may reside on a computer-readable storage medium, which may or may not be a removable medium.

In the following description, the term "domain" is used to refer to the bounded region that is being gridded and modeled. A Delaunay triangulation is considered to be "constrained" if it resolves internal linear features and boundaries in a domain with the edges of the triangles. A Voronoi grid is considered to be "constrained" if it resolves internal linear features and boundaries in a domain with the edges of the cells. A Delaunay triangulation constructed on the given set of points and not restricted to honor any features is called herein an "unconstrained" Delaunay triangulation. The known algorithms for generating constrained Delaunay triangulations (see, e.g., J. R. Shewchuk, *Delaunay refinement algorithms for triangular mesh generation*, Computational Geometry: Theory and Applications, v. 22, pp. 21-74, 2002; J. Ruppert, *A Delaunay refinement algorithm for quality 2-dimensional mesh generation*, J. Algorithms, vol. 18, no. 3, pp. 548-585, 1995; L. P. Chew, *Constrained Delaunay triangulation*, Algorithmica, vol. 4, pp. 97-108, 1989; and G. L. Miller, S. E. Pay, & N. J. Walkington, *When and why Ruppert's algorithm works*, Proceedings of the 12$^{th}$ International Meshing Roundtable, pp. 91-102, 2003) and unconstrained Delaunay triangulations (see, e.g., Bowyer, supra) are different in implementation, complexity, and computational cost. A Delaunay triangulation or Voronoi grid is called "adaptive" when the point density is controlled, preferably such that there are more points where greater accuracy is needed.

The disclosed methods for generating adaptive constrained Delaunay triangulation and Voronoi grids allow resolving the internal features exactly with the Voronoi cell faces while adapting the grid cell sizes to a specified point density distribution. They overcome difficulties, such as the presence of small features, multiple feature intersections, feature intersections at small angles, and features with high curvatures, which cannot be handled satisfactorily by existing algorithms.

1. Method for Adaptive Constrained Delaunay Triangulation

The following disclosure addresses a method for generating constrained Delaunay triangulation that conforms to internal and boundary features and has adaptive sizes based on a specified density criterion.

Step 1

Construct feature polylines from digitized form (e.g., A. Cunha, S. Canann, & S. Saigal, *Automatic boundary sizing for 2D and 3D meshes*, AMD-Vol. 220 Trends in Unstructured Mesh Generation, ASME, pp. 65-72, 1997) or input them, depending on the available geometry description. In order to conform to the specified density requirements, sometimes it is necessary to refine the given polylines (i.e., shorten the polyline segments by inserting additional points on the polylines).

Step 2

Construct an unconstrained Delaunay triangulation by any known algorithm (e.g., Bowyer, supra) from the points forming the end-segments of the polynomial features and/or boundaries—obtained in Step 1 and a set of points with density-defined or uniform distribution throughout the domain (points, coincident within the specified tolerance, are treated as one). The resulting triangulation does not conform to the features.

Step 3

Modify the initial triangulation to make it conform to the features and/or boundaries by swapping all edges in triangulation that intersect the feature segments and correcting the resulting mesh by a well-known strategy of recursively applying local edge-swap until all interior (i.e., not lying on the features) edges of triangulation are locally optimal (e.g., C. L. Lawson, *Surface for C$^1$ surface interpolation*, surface interpolation, JPL Publication pp. 77-30, 1977). This is illustrated in FIGS. 3A and 3B. In FIG. 3A, feature segments 71 are crossed by triangulation edges 73. Triangulation edges 73 are marked for swap, which is signified by their depiction with dashed lines, and their positions after swap is shown in FIG. 3B, which can result in edge 73 becoming identical with feature segments 71. Internal feature segments 71 are now triangulation edges 74 in FIG. 3B. The resulting mesh conforms to the features, but it might be of poor quality near the features.

Step 4

Apply a grid correction procedure comprising grid smoothing and feature-capturing algorithms. A smoothing algorithm (e.g., Q. Du and M. Gunzburger, *Grid generation and optimization based on centroidal Voronoi tessellations*, Appl. Math. Comput., v. 133, pp. 591-607, 2002) with density distribution can be used. The smoothing algorithm iteratively moves the grid points, e.g. to the mass centers of their Voronoi regions. Thus, the number of points remains the same but their positions change. Triangulation has to be corrected after each iteration of smoothing in order to remain Delaunay, which can be done again by recursive local edge-swap until all edges of triangulation are locally optimal (e.g., Lawson, supra). The smoothing terminates when some tolerance criterion—e.g., small cumulative change in the grid point position during last iteration—is met.

In an iteration of the grid correction procedure (Step 4 herein) combine the smoothing iteration with a feature-capturing procedure, which is based on the following two local operations:

i. Snap an interior point to a feature segment, as illustrated in FIG. 4A. When interior point 75 is a vertex of a triangle opposite a boundary/feature edge 74 and the angle at the vertex is obtuse, interior point 75 is projected onto the feature edge followed by the swap of the edge 74.
  ii. Move feature point 76 from a feature segment into the interior, as illustrated in FIG. 4B. Perform the operation when interior point 75 is opposing feature edges on the same feature segment in preferably at least three triangles and the summary of the angles at the point is acute. During the operation, one of the edges connecting internal point 75 and feature point 76 shared by two feature segments opposing point 75 is shrunk (preferably in half) by moving feature point 76 into the interior. The movement causes some edges connecting to feature point 76 to intersect the feature segment. These edges 73 are swapped as in STEP 2 above.

An iteration of the mesh correction procedure is performed as follows:

i. Iteratively loop through all the points in triangulation and snap the candidate points to the features until there are no more candidates satisfying the condition formulated above; as a result, only acute angles are facing the feature edges.

ii. Similarly, iteratively loop through all the points removing candidate points from the features.
iii. Correct the triangulation by recursive edge-swap (e.g., Lawson, supra) of interior edges.
iv. Reposition all points to the mass centers of their Voronoi regions (points on the features are moved along the features only as in, e.g., Du et al., supra).
v. Correct triangulation by recursive edge-swap of interior edges.

Figure 5:
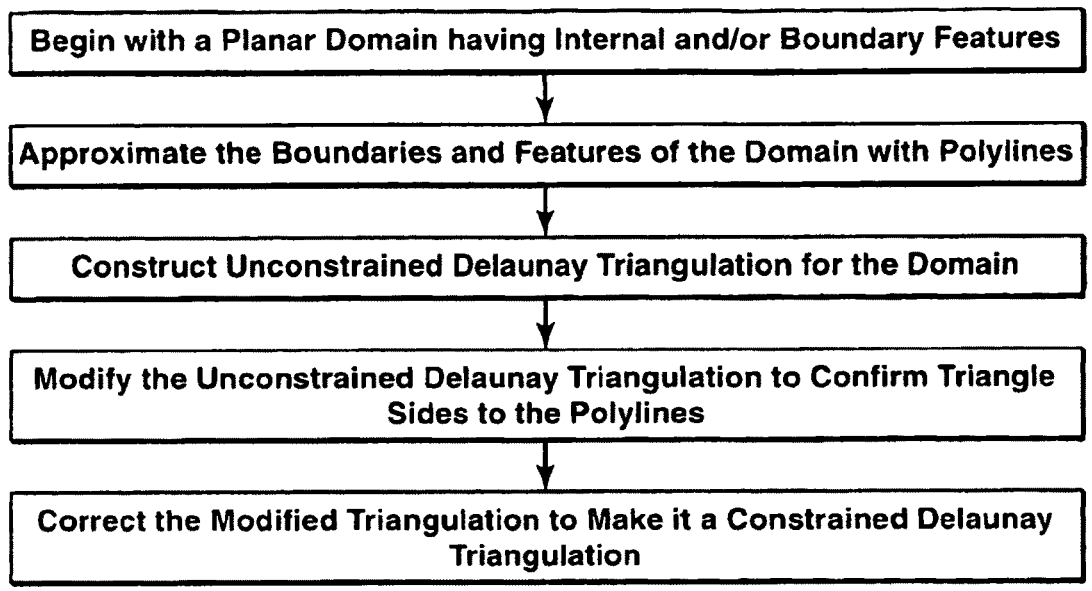
FIG. 5 is a flowchart illustrating a method for generating a constrained Delaunay triangulation.

The resulting smoothed constrained Delaunay triangulation will be of good quality and consistent primarily with the point density distribution both in the interior of the domain and on the features and/or boundaries. FIG. 5 illustrates the basic steps of this method in flowchart form.

2. Method for Generating Constrained Voronoi Grids

The following disclosure addresses a method for generating constrained Voronoi grids that conform to internal and boundary features and have adaptive sizes based on specified density criterion.

Step 1
Construct feature polylines from digitized form (e.g., Cunha et al., supra) or input them interactively, depending on the available geometry description. In order to conform to the specified density requirements, sometimes it is necessary to refine the given polylines (i.e., shorten the polyline segments by inserting additional points on the polylines).

Figure 6:
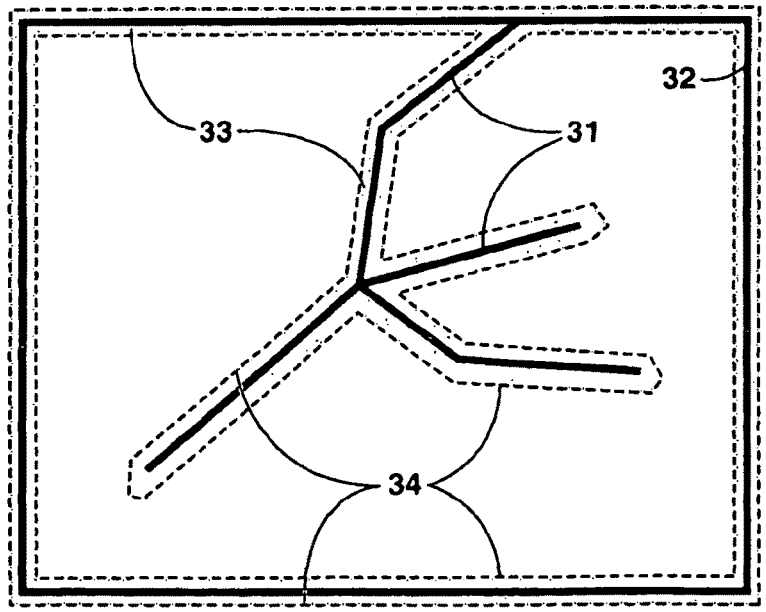
FIG. 6 is a top view of a structural framework showing internal features and boundaries of a two-dimensional domain as well as protection areas around the features.

Step 2
Construct protected polygons around the polylines. Protected polygons surround feature polylines with a protection area and are constructed to yield an exact representation of the features on the final Voronoi grid. The concept is illustrated in FIG. 6 where internal features 31 and model boundary 32 are enclosed in the protection area 33. Protection area 33 is bounded by edges of protected polygons 34 which will become edges of the Delaunay triangulation.

Figure 7A:
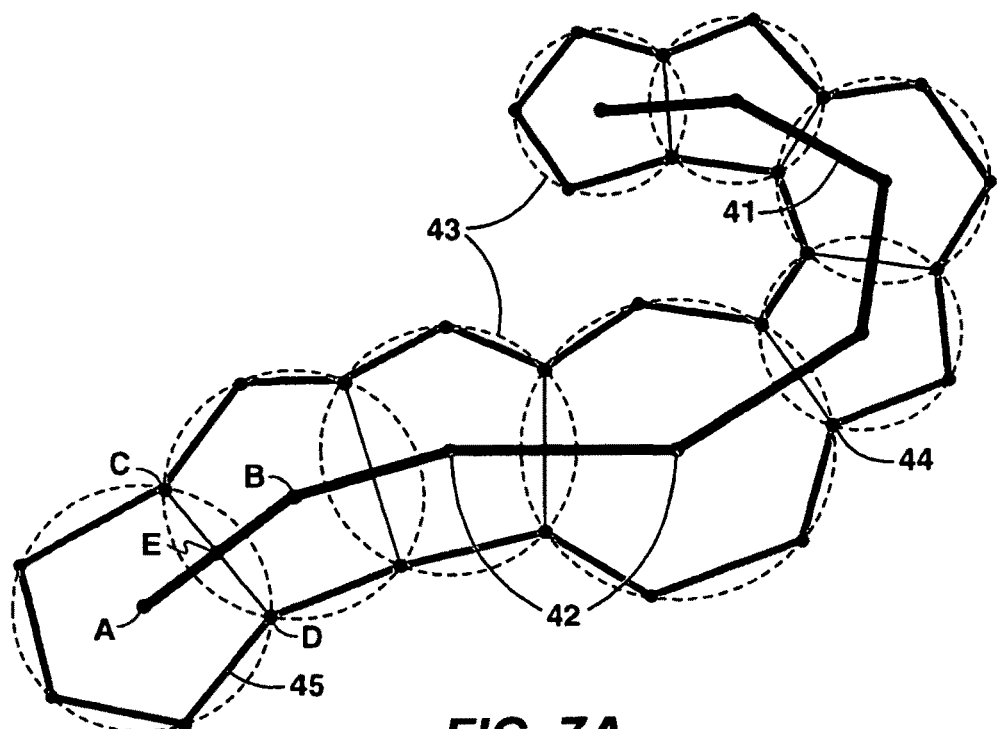
FIG. 7A is a top view of an internal feature illustrating one embodiment of a method for forming a Voronoi grid conforming to an internal feature.
Figure 7B:
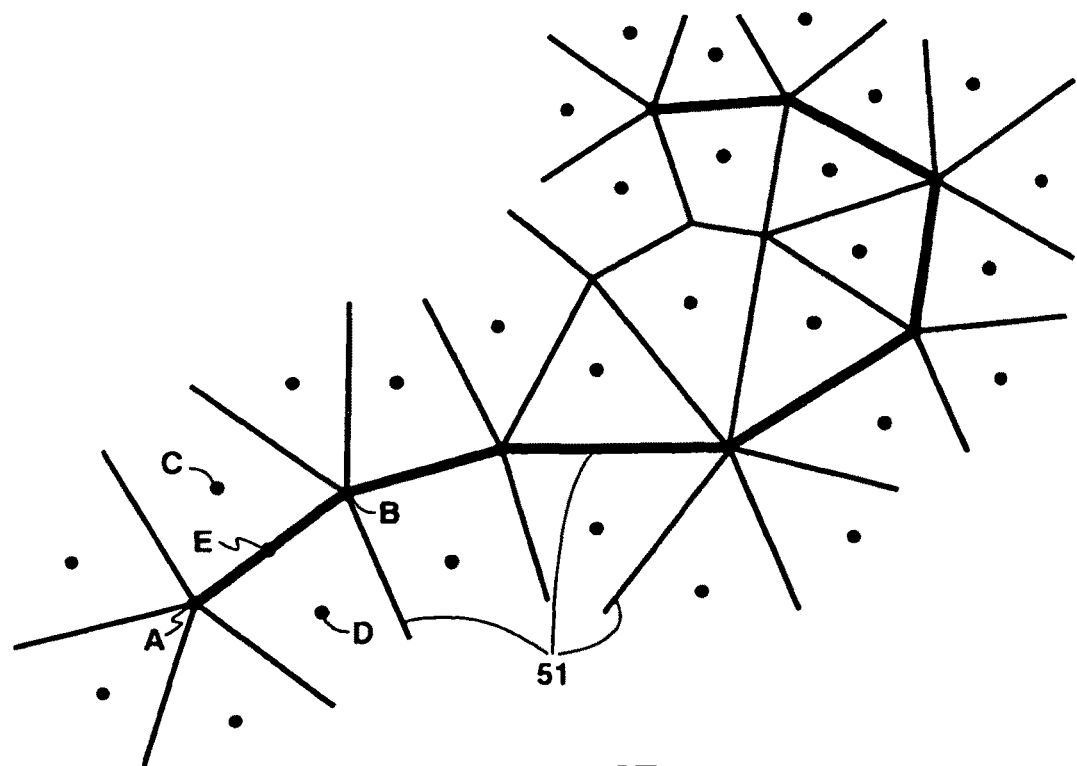
FIG. 7B shows Voronoi grids generated for the internal features of FIG. 7A.

Generate the points used to form the protected polygons as follows. Consider a polyline as 41 in FIG. 7A and assume that all segments in the polyline will be polygon (cells) edges in the final Voronoi grid. Thus, the vertices 42 on the polyline are vertices in the final Voronoi grid. Form intersecting circular disks 43 around these vertices. The circles may have a wide range of radii depending on feature geometry. Excessively large circles may be avoided by subdividing line segments into smaller sections. The two intersection points 44 of two neighboring circles will be vertices of the protected polygon. Note that line segment AB is a perpendicular bisector of line segment CD. Additional points can be placed on the boundary of the union of the disks; no point is allowed inside that boundary. With these points, a protected polygon 45 is formed around the polyline. The edges of the protected polygon will be preserved in a constrained Delaunay triangulation. All the points on the protected polygon are cell centers of the final Voronoi grid shown in FIG. 7B with edges of Voronoi cells 51.

It is preferable that the line segment formed by the intersections of two neighboring circles (e.g., CD) intersect the segment with end points being the centers of the circles (e.g., AB). This is not always possible if a long segment on the polyline neighbors two much shorter segments. In this case, the long segment can be partitioned into two or more shorter segments by inserting additional points on the long segment.

Inside the protected polygon 45, the Delaunay triangulation is not unique because triangles formed by points on the same circle share the same circumcenter, i.e., the center of the circle (an example is point A). Since the protection area bounded by the protected polygon contains no point other than the ones on its boundary (vertices on the feature polyline are not used in the triangulation), any Delaunay triangulation inside the protection area leads to a Voronoi diagram whose edges include the line segments on the polyline. The resulting Voronoi diagram is unique.

Figure 8A:
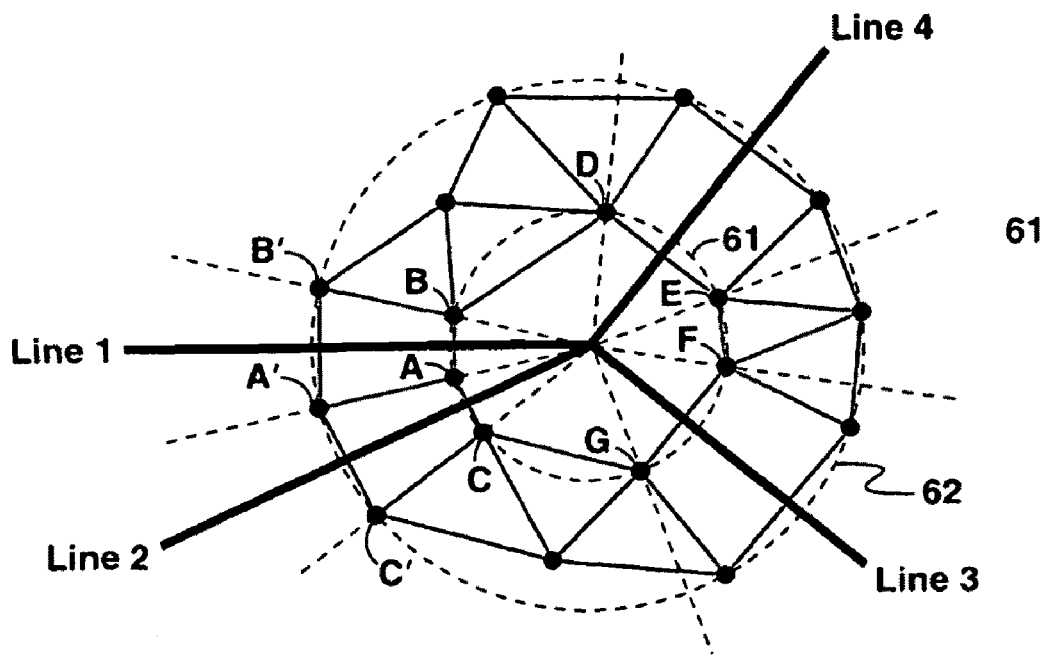
FIG. 8A is an illustration of one embodiment of a method for forming a Voronoi grid around an intersection point of multiple internal features.
Figure 8B:
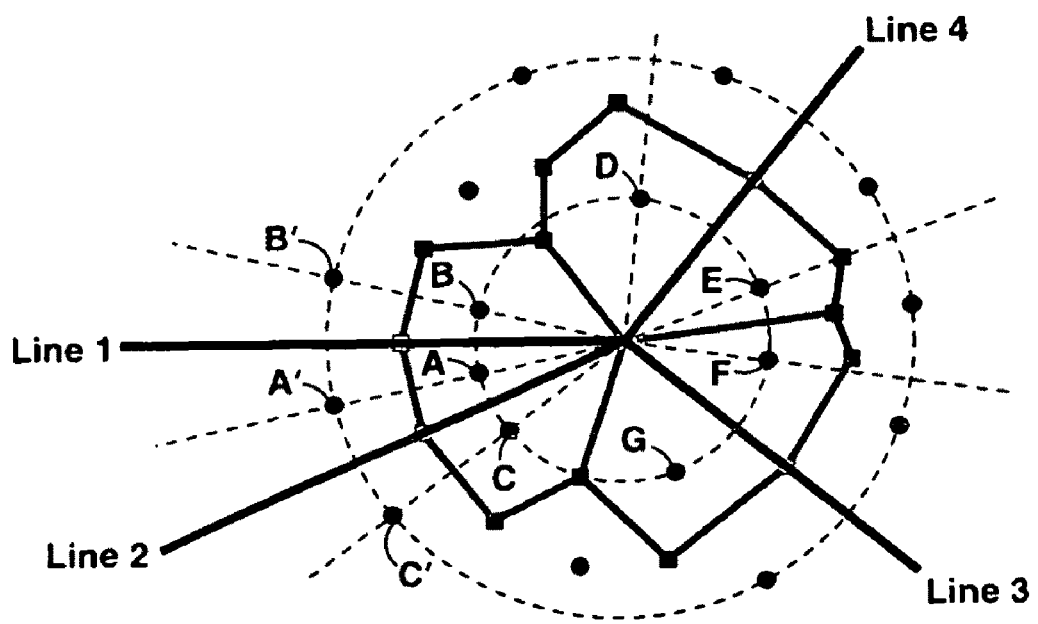
FIG. 8B shows the Voronoi grid generated around the intersection point in FIG. 8A.

To deal with the case of multiple polylines intersecting at one point, the technique exemplified in FIG. 8 may be used. In the example, four polylines (marked as Lines 1 to 4) intersect at one point. Place points around the intersection on a circle centered at the intersection point (i.e., inner circle 61 in FIGS. 8A and 8B). Thus, any Delaunay triangulation of the polygon produces triangles that share the same circumcenter, i.e., the intersection point.

To honor the intersecting polylines, the pair of points on the two sides of a polyline need to form mirror images with respect to the polyline (e.g., pairs A-B, A-C, D-E, and F-G in FIG. 8). For sharp angles such as the one formed between Line 1 and Line 2, it is preferable to place only one point on the dashed line bisecting the angle. This results in a triangular Voronoi cell to fit into the sharp angle. Again, no points are placed inside the inner circle.

Another circle as 62 in FIG. 8A can be used to further control the layout of Voronoi cells near the intersection, especially when sharp angles are present. Points are placed on this outer circle in the same way as those on the inner circle. However, points are allowed inside the outer circle. These points are used to control the sizes and shapes of Voronoi cells. Further away from the intersections, the method illustrated in FIGS. 7A and 7B should be used to place points around the polylines.

The radii of circles placed around the polylines and the intersections points are determined based on given point density distribution and local geometric features.

Step 3
Use the Delaunay triangulation algorithm, such as Delaunay triangulation (Shewchuk, supra), Ruppert's algorithm (Ruppert, supra), or its modifications (e.g., Chew, supra; Miller, supra) to grid the complement to the protection areas with respect to the gridding domain honoring the protection areas as the constraints. The complement of the protection area is the area outside of the protection area, but within the domain boundaries. That is, generate constrained Delaunay triangulation having protected polygon sides as constraints in the complement to the protected polygons with respect to the original domain. For example, Ruppert's algorithm works in the 2D domain with a given planar straight line graph consisting of a set of linear segments and a set of points, which in our case are represented by the boundaries of the protection areas and, optionally, additional points near the feature intersections.

The algorithms disclosed in Shewchuk, supra; Du et al., supra; Ruppert, supra; Chew, supra; and Miller et al., supra, are based on point insertion and refinement, and the density of grid points, and correspondingly the size of the triangles, is dictated by the size and shape of geometric features. The point insertion can be modified to account for the given point density distribution, such that more points are inserted—i.e., more refinement is enforced—in the regions where the point density distribution value is high. Some of the known techniques (e.g., R. Lohner, & J. Cebral, *Generation of non-isotropic unstructured grids via directional enrichment*, International Journal for Numerical Methods in Engineering, vol. 49, pp. 219-232, 2000) can be used for this purpose. The resulting triangulation primarily adapts to the geometry of the features (i.e., having smaller cells in the areas of high curvature of a feature or an intersection of several features at small angles), and also obeys the size distribution defined by the given point density distribution.

Grid smoothing, such as in Du et al., supra, can be applied to the triangulation, further improving its quality and consistency with the point density distribution away from the features and boundaries while protected points must remain unchanged during the smoothing. Grid smoothing is preferable though it is optional.

Step 4

Figure 9:
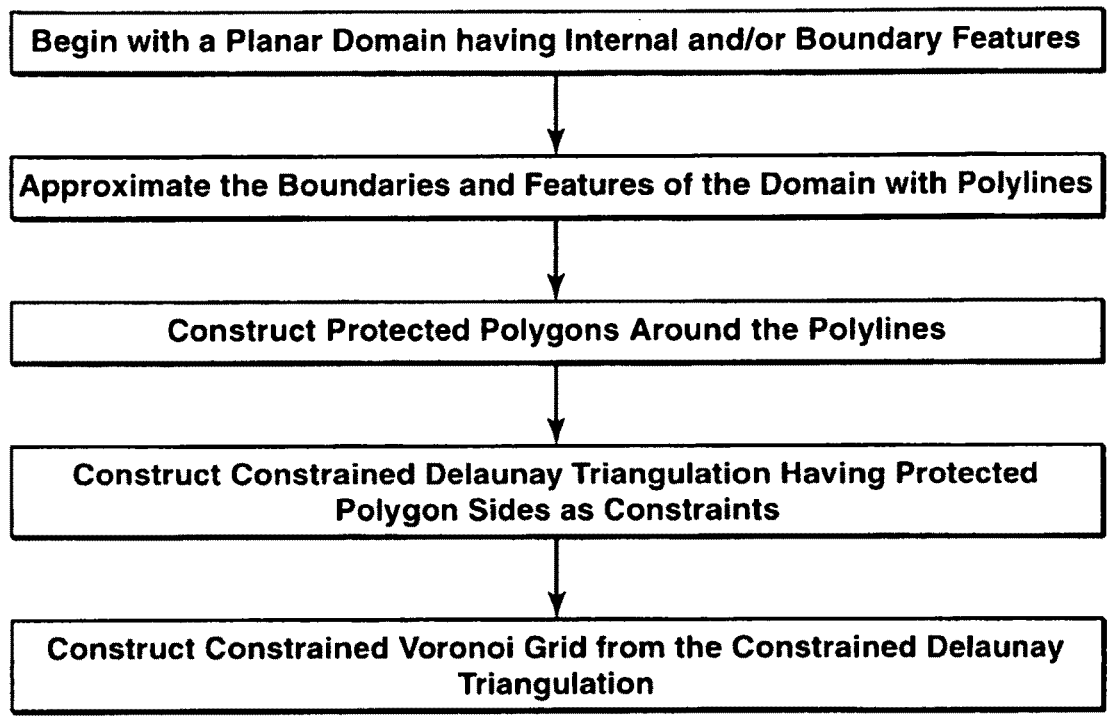
FIG. 9 is a flowchart illustrating a method for generating a constrained Voronoi grid.

In a standard procedure, construct the cells of dual Voronoi grid by connecting the circumcenters of Delaunay triangles. That is, a Voronoi cell is constructed by traversing all Delaunay triangles sharing the vertex in order (clockwise or counterclockwise) around this vertex and connecting the circumcenters of these Delaunay triangles by edges. Thus, the vertex becomes the center of the newly constructed Voronoi cell, edges joining triangle circumcenters become Voronoi cell edges, and triangle circumcenters become vertices of the Voronoi cell. Triangulation vertices outside gridding domain boundaries are not used in this procedure to form centers of Voronoi cells. FIG. 9 illustrates the basic steps of this method in flowchart form.

3. Alternative Method for Generating Constrained Voronoi Grids

In another embodiment, constrained Voronoi grids that conform to internal and boundary features and have adaptive sizes based on specified density criterion may be generated by the following steps:

Step 1

Construct feature polylines P1 from digitized form (e.g., Cunha et al., supra) or input them interactively, depending on the available geometry description. In order to conform to the specified density requirements, sometimes it is necessary to refine the given polylines (i.e., insert points on the polylines).

Step 2

Construct a constrained Delaunay triangulation T conforming to the polynomial features and/or boundaries using algorithms in Shewchuk, supra; Ruppert, supra; Chew, supra; and Miller et al., supra or our new method above. Optionally, use a point density distribution during triangulation and/or perform smoothing (e.g., as described in Step 4, of the first approach for Voronoi grid generation).

Step 3

Construct protected points around the polylines from the vertices of Delaunay triangles lying on the polylines; i.e., transform the points on the features/boundaries into the protected points. Replace each boundary point lying on the straight segment by a pair of protected points forming a mirror image of each other with respect to this segment (e.g., points C and D formed from boundary point E in FIGS. 7A and 7B). Each boundary point lying at an intersection of several segments is replaced by a set of points placed on the circle around the intersection such as points A to G in FIGS. 8A and 8B. The radius of the circle—i.e., the distance between the old boundary point and any protected point formed from it—is determined as a fraction of minimum edge length (preferably 0.25) of all triangle edges connected to the boundary point.

Figure 10A:
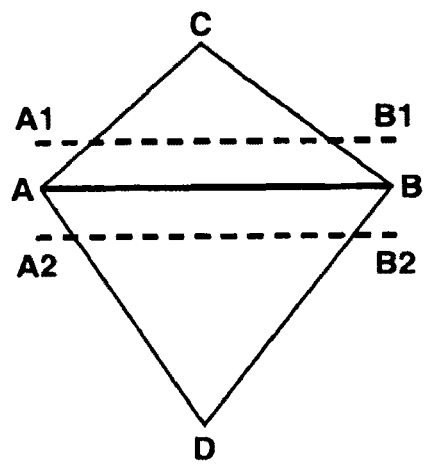
FIG. 10A-C are views showing adjustment of the set of protected points in one embodiment of a method for generating constrained Voronoi grids.
Figure 10B:
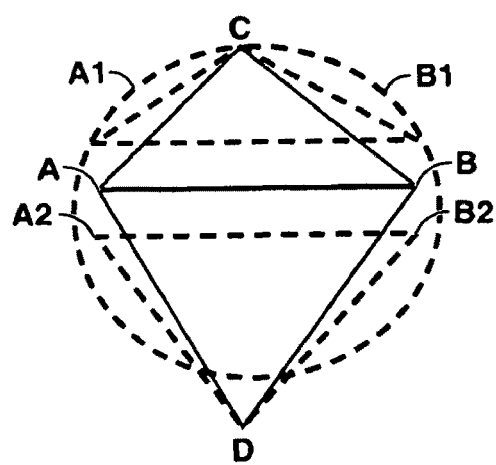
Figure 10C:
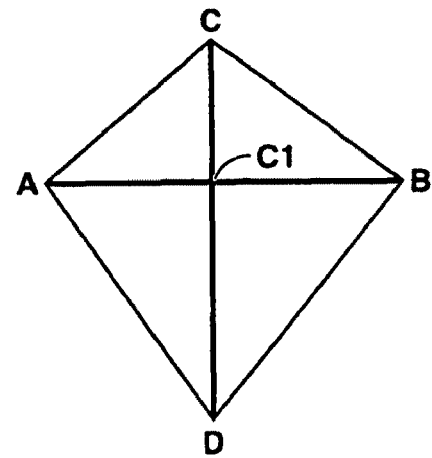

Polygonal boundaries P2 of protection areas are formed by joining protected points. In order to ensure that Delaunay triangulation of the new set of points S consisting of all the interior (non-boundary) vertices from triangulation T in Step 2 and the new protected points in Step 3 contains all edges of P2 some further adjustment to the set of points S might be required. To this end, an additional step of adding point projections onto the constraints to the initial triangulation T is performed prior to constructing protection areas (illustrated in FIG. 10). First, we estimate the current protection area position by determining protected points and forming a pair of mirror-image protection edges A1B1 and A2B2 in FIG. 10A from each constrained edge AB of T (we call an edge of triangulation T lying on a constraining segment of P1 a constrained edge, and edges constituting protection polygon P2 protection edges). Then we search for protection edges that violate the Delaunay condition by searching through modified triangles A1B1C in FIG. 10B in T with the constrained edges AB substituted by corresponding estimated protection edges A1B1 (whichever is closer to the opposite triangle vertex). The check determines if the end points of the mirror image protection edge A2B2 formed from the same constraint edge AB are located inside the circumcircle of the modified triangle A1B1C. If found, the corresponding constrained edges AB are divided by adding a projection C1 of opposite triangle vertex C onto the edge AB to the vertices of triangulation T (see FIG. 10C). Set of protected points S is updated by reconstructing protected points from the new boundary points A, B, and C1 of T. This adjustment is repeated iteratively until no more non-Delaunay protection edges are present.

Step 4

Construct a Delaunay triangulation of the set of points S from Step 3. This triangulation is generated using any unconstrained Delaunay triangulation algorithm (e.g., Bowyer, supra). Since the point set is specified, the triangulation algorithm here does not need to account for point density distribution or constraints. Furthermore, only the regions around the newly inserted protected points need to be triangulated; the rest of the Delaunay triangulation remains the same as after Step 2. Optionally, smoothing can be performed, which keeps the protected points unchanged.

Step 5

Figure 11:
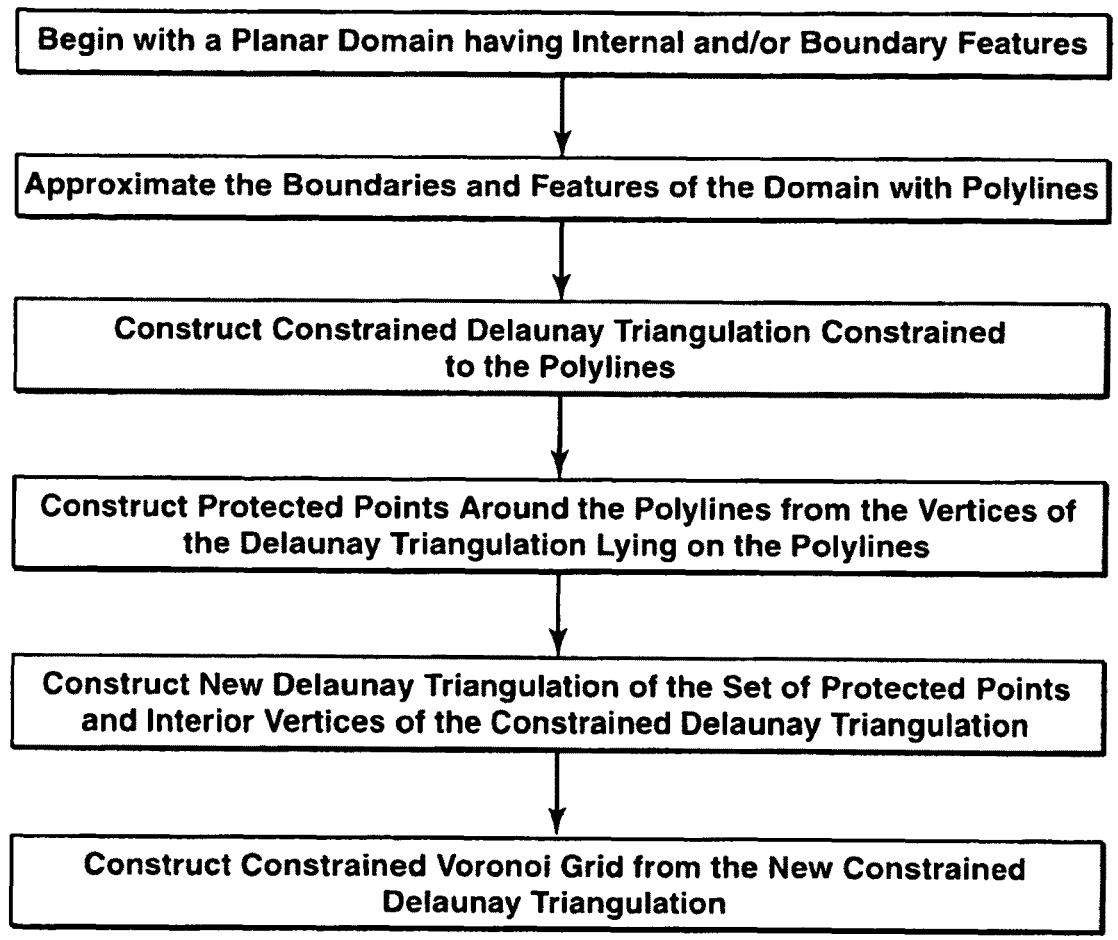
FIG. 11 is a flowchart illustrating an alternative method for generating a constrained Voronoi grid.

In a standard procedure, construct the cells of dual Voronoi grid by connecting the circumcenters of Delaunay triangles. That is, Voronoi cell is constructed by traversing all Delaunay triangles sharing the vertex in order (clockwise or counterclockwise) around this vertex and connecting the circumcenters of these Delaunay triangles by edges. Thus, the vertex becomes center of the newly constructed Voronoi cell, edges joining triangle circumcenters become Voronoi cell edges, and triangle circumcenters become vertices of the Voronoi cell. Triangulation vertices outside gridding domain boundaries are not used in this procedure to form centers of Voronoi cells. FIG. 11 illustrates the basic steps of this alternative method in flowchart form.

4. Examples

Number 1

Figure 12A:
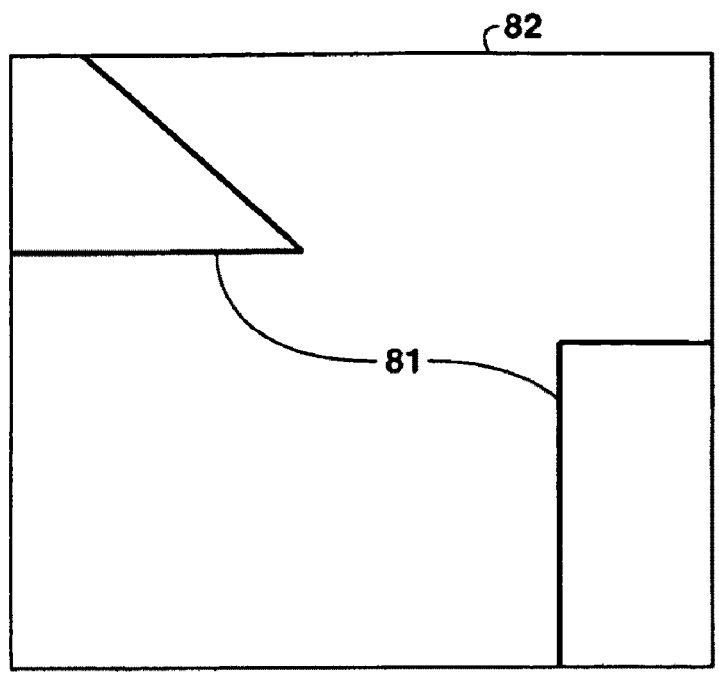
FIG. 12A shows a plane with approximated internal features and domain boundaries.
Figure 12B:
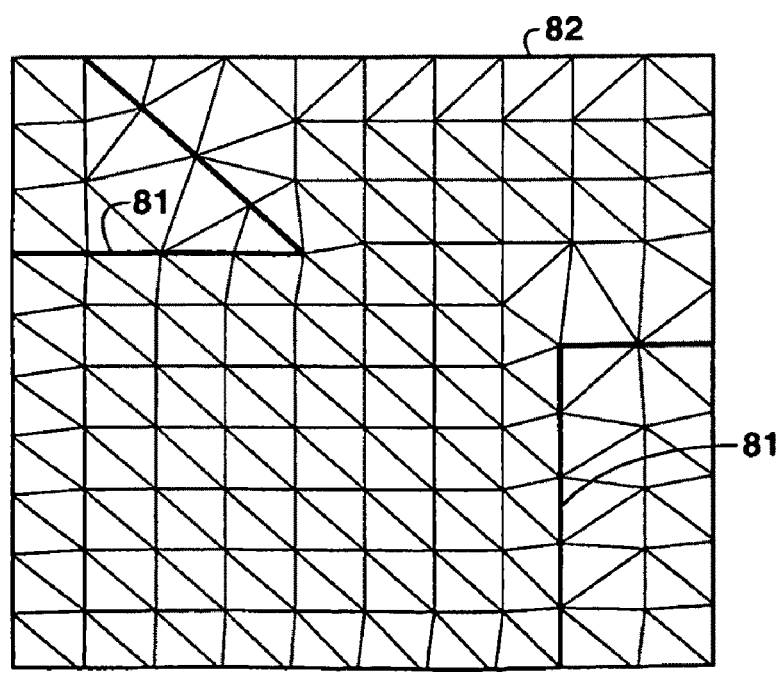
FIG. 12B shows Delaunay triangulation conforming to the internal features and boundaries.
Figure 12C:
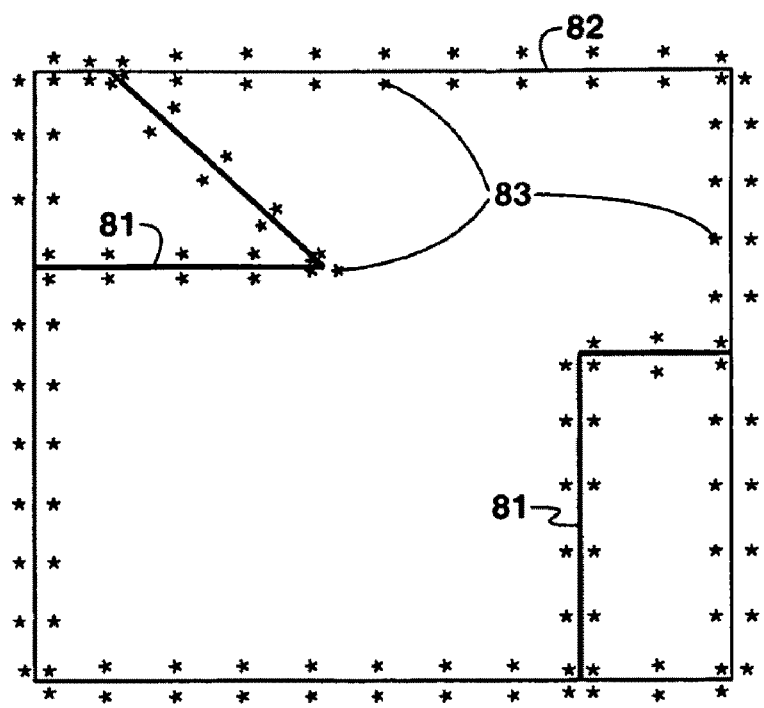
FIG. 12C shows protected points placed around the features and borders.
Figure 12D:
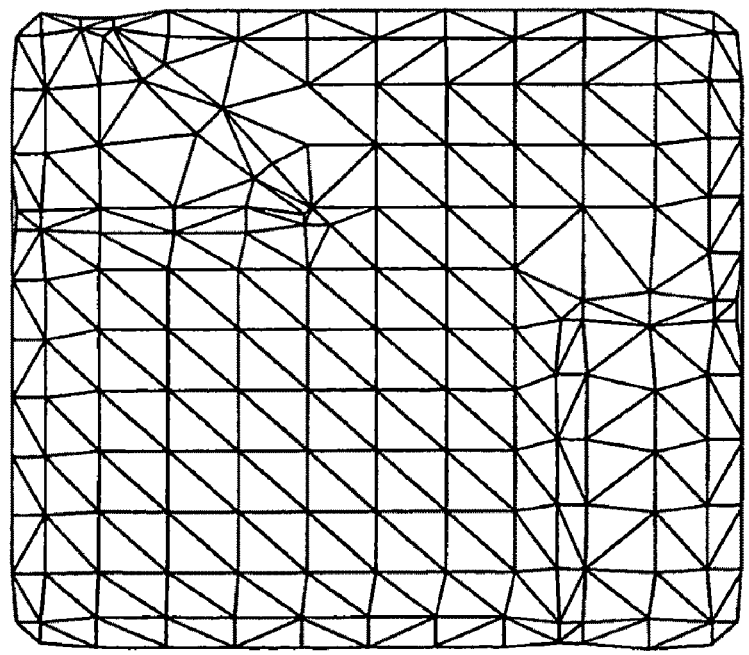
FIG. 12D shows the creation of new Delaunay triangulation using the protected points shown in FIG. 12C.
Figure 12E:
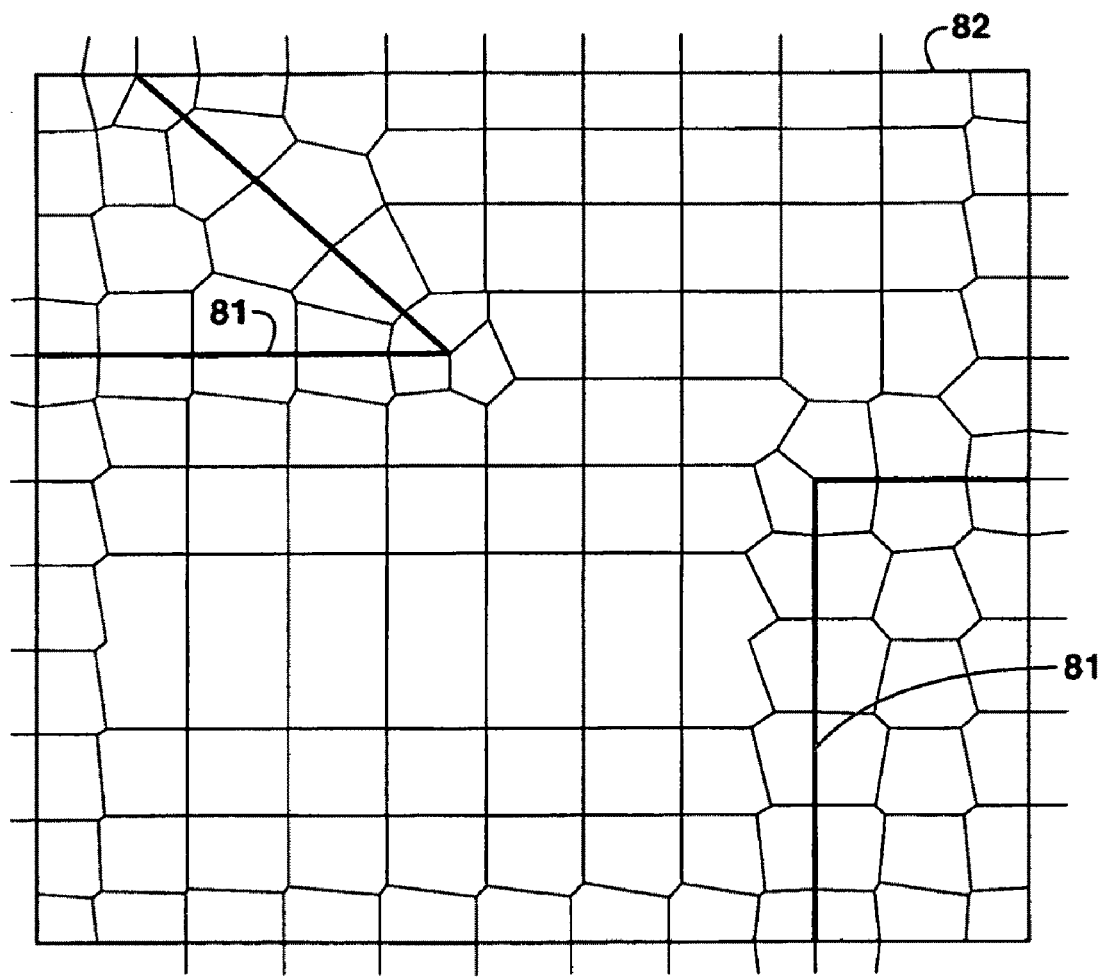
FIG. 12E shows a Voronoi grid generated from the Delaunay triangulation of FIG. 12D.

Referring to FIGS. 12A-E, an illustration of the embodiment described above as "Alternative method for generating constrained Voronoi grids" is given. For a given plane approximate the internal features 81 and boundaries 82, as shown in FIG. 12A. Construct constrained Delaunay triangulation for the plane, as illustrated in FIG. 12B. As shown in FIG. 12C, introduce protected points 83 around the internal features 81 and boundaries 82. Construct new constrained Delaunay triangulation using the new set of points, as illustrated in FIG. 12D. FIG. 12E shows the final Voronoi grid constrained by the internal features and boundaries. The number of grid cells/points is dictated by a given uniform density requirement.

Number 2

Figure 13A:
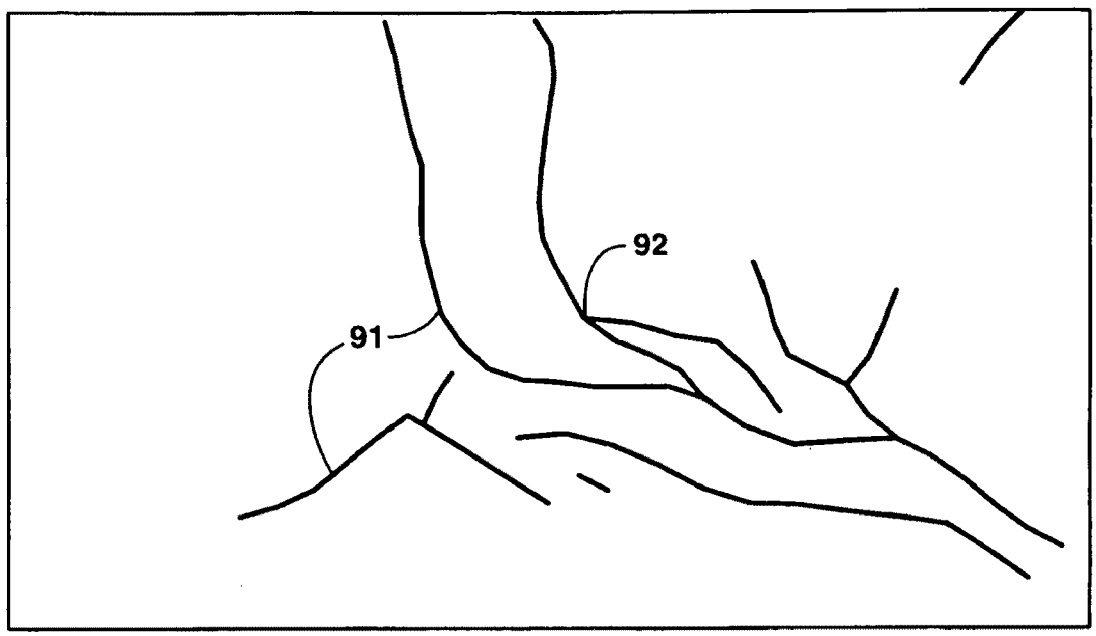
FIG. 13A shows a plane with complex internal features.
Figure 13B:
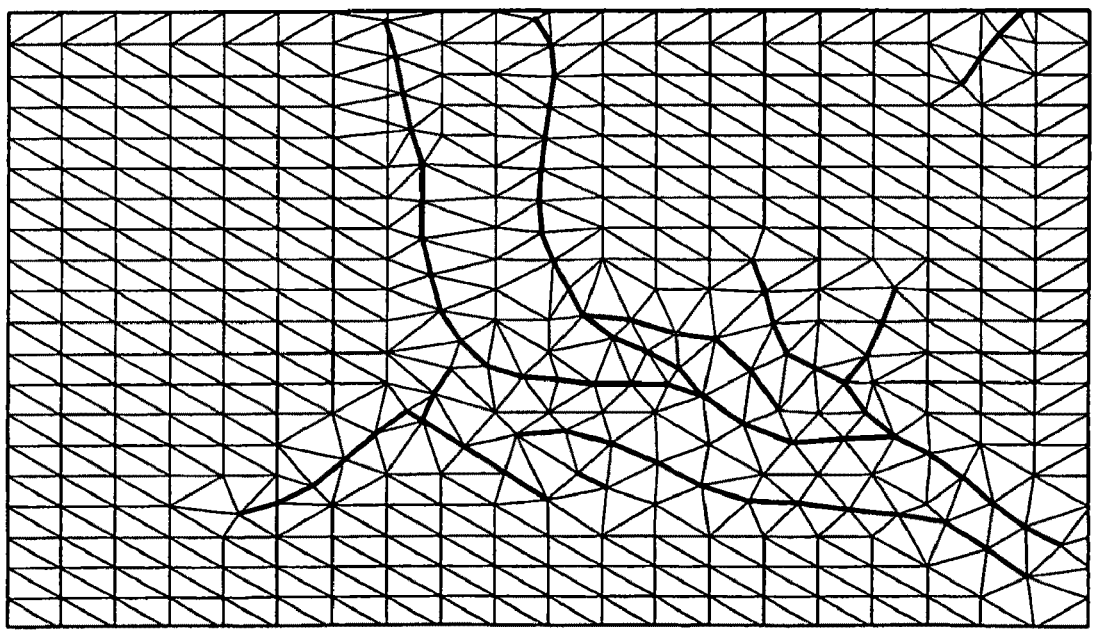
FIG. 13B shows constrained Delaunay triangulation generated per the disclosed method for the plane in FIG. 13A.
Figure 13C:
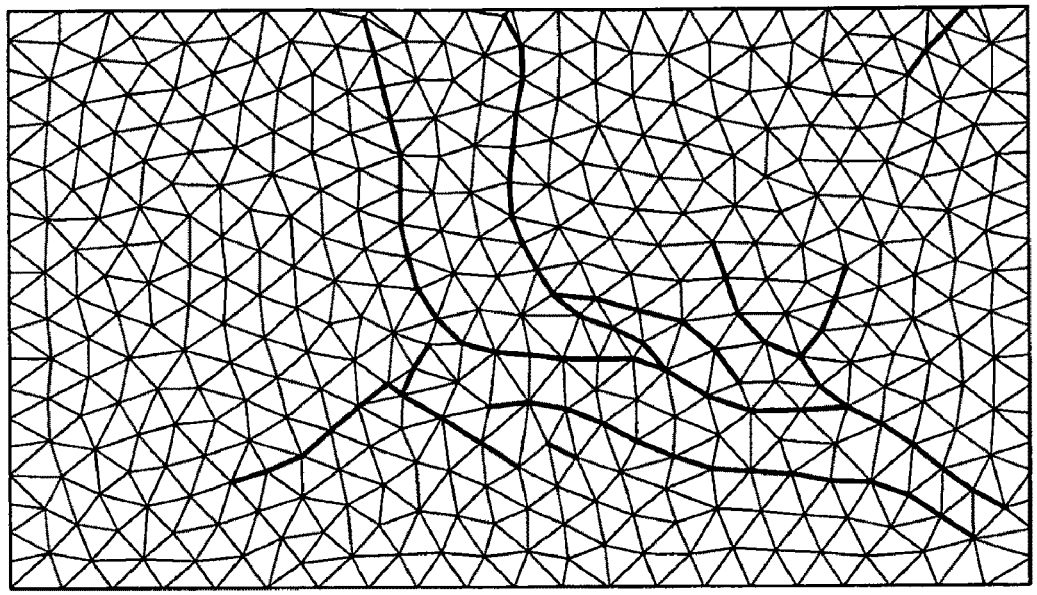
FIG. 13C shows smoothed Delaunay triangulation for the plane in FIG. 13A.
Figure 13D:
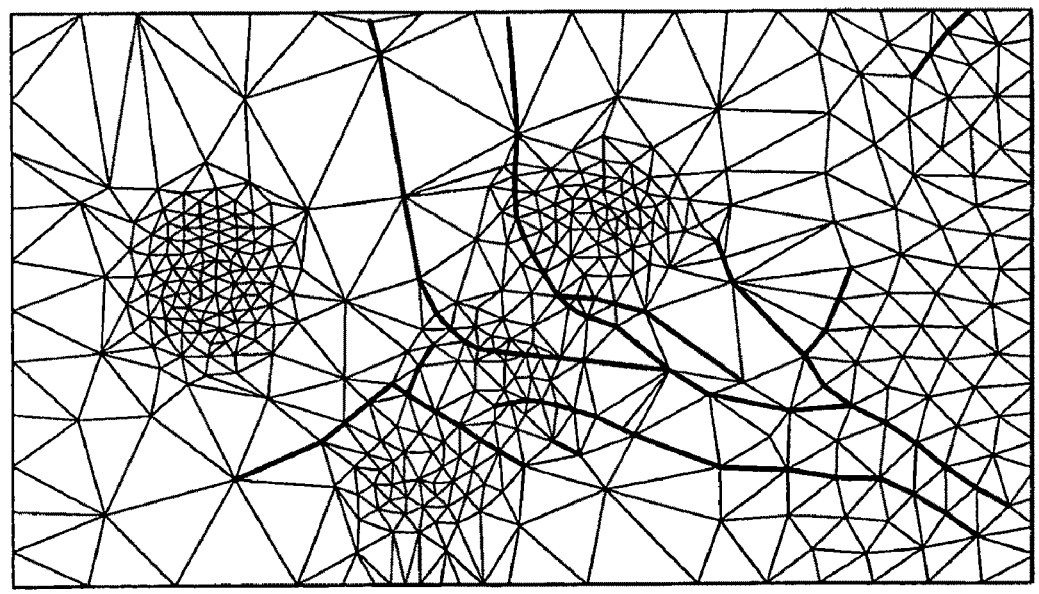
FIG. 13D shows Delaunay triangulation adapted to a point density distribution for the plane in FIG. 13A.

Referring to FIGS. 13A-F, an illustration of the embodiments described above as "Alternative method for generating constrained Voronoi grids" and "New approach for adaptive constrained Delaunay triangulation" is given. FIG. 13A shows a plane with numerous internal features, including intersections 92 between features. The internal features—in this example, obtained from fault traces in the geological description of a faulted hydrocarbon reservoir—are approximated by a set of polylines 91, shown in the FIGS. 13A-13F illustrating this example. FIG. 13B illustrates constrained Delaunay triangulation per the disclosed method. FIG. 13C shows the Delaunay triangulation after grid smoothing. FIG. 13D illustrates the constrained Delaunay triangulation adapted to a point density distribution.

Figure 13E:
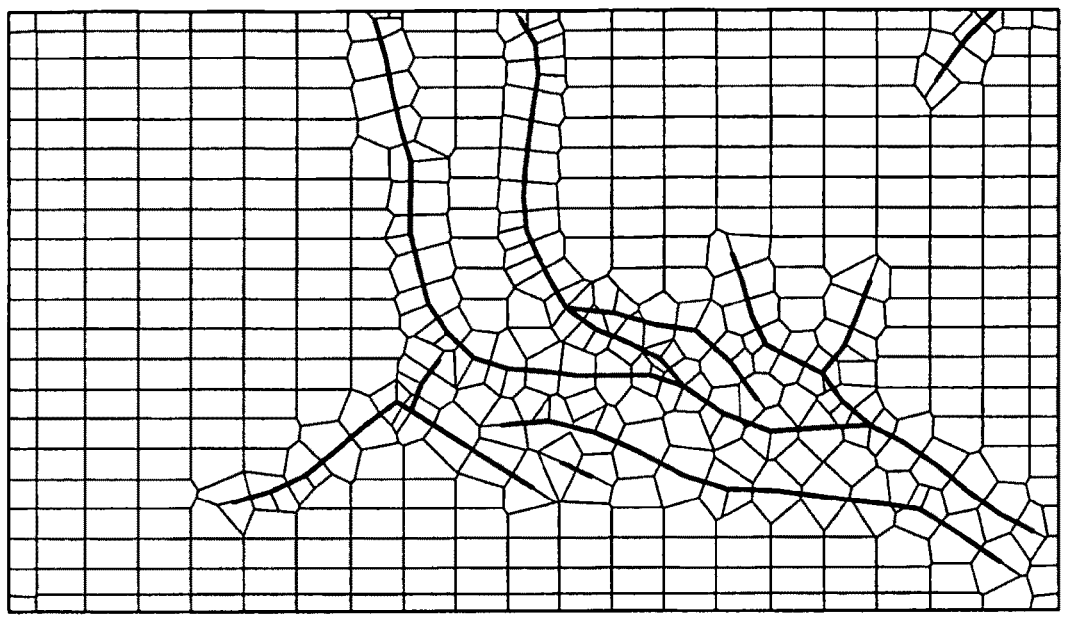
FIG. 13E shows a constrained Voronoi grid generated from FIG. 13B.
Figure 13F:
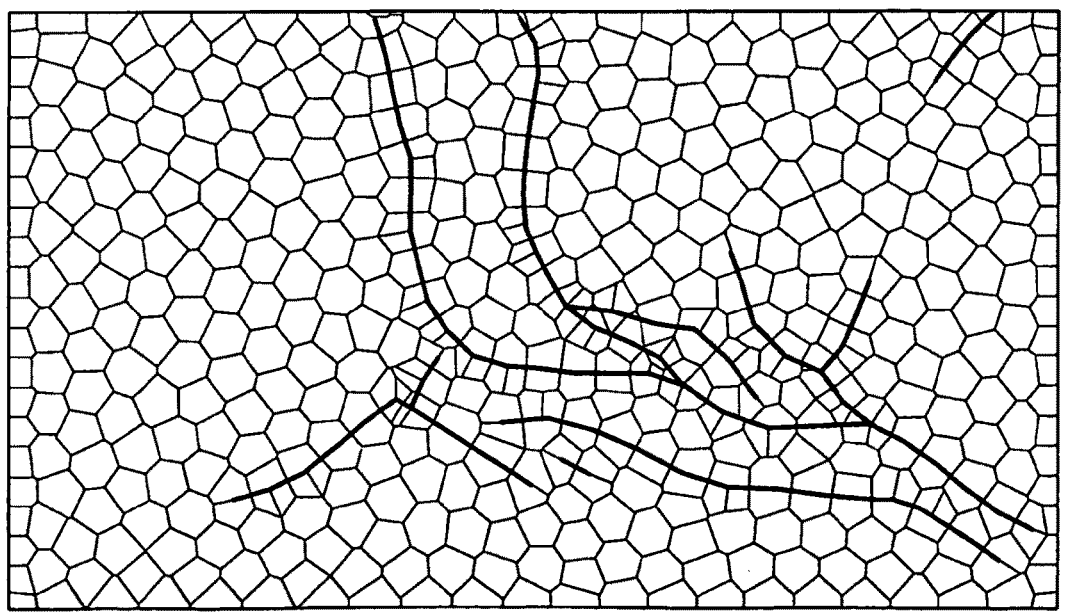
FIG. 13F shows a smoothed constrained Voronoi grid generated from FIG. 13C.
Figure 13G:
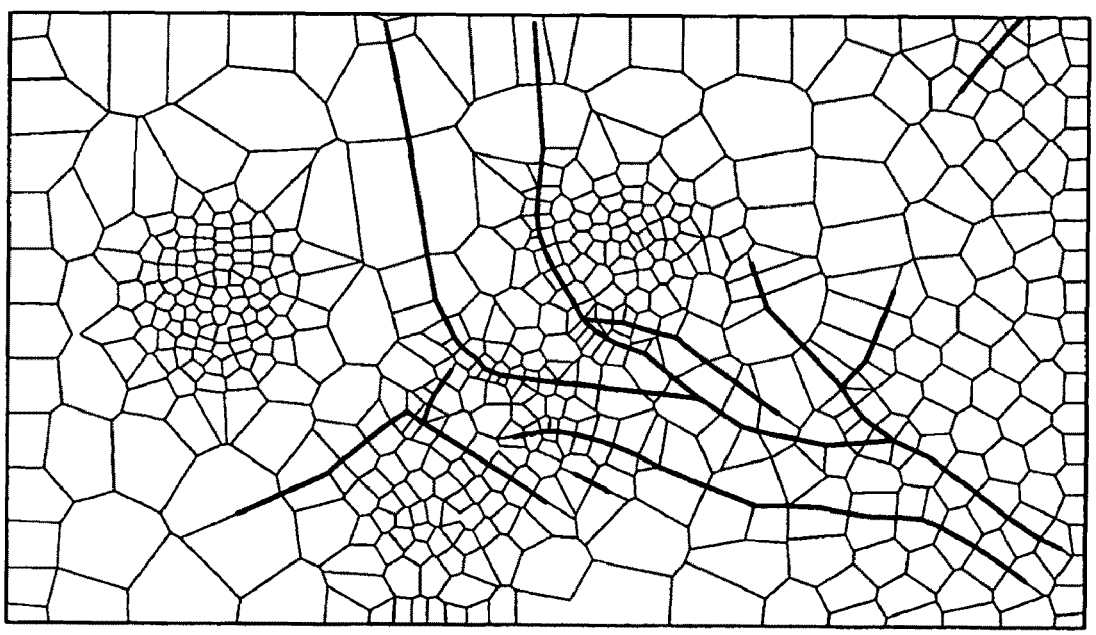
FIG. 13G shows a constrained Voronoi grid adapted to a point density distribution generated from FIG. 13D.

FIG. 13E shows a constrained Voronoi grid according to the present disclosure for the plane in FIG. 13A. The Voronoi grid may be generated from smoothed Delaunay triangulation, as shown in FIG. 13F, and/or adapted to a point density distribution, as shown in FIG. 13G.

Although the present disclosure has been described in detail, it should be understood that various changes, substitutions and alterations can be made thereto without departing from the scope and spirit of the invention as defined by the appended claims.

We claim:

1. A computer-implemented method for generating a constrained Voronoi grid for a planar domain with boundaries and internal features, the planar domain representing at least part of a hydrocarbon reservoir, the method comprising the following steps, at least one of which is implemented using a computer:
    approximating the boundaries and internal features of the domain with polylines;
    constructing constrained Delaunay triangulation constrained to the polylines;
    constructing protected points around the polylines from the vertices of the constrained Delaunay triangulation lying on the polylines;
    constructing new unconstrained Delaunay triangulation of the set of protected points and interior vertices of the constrained Delaunay triangulation; and
    constructing the constrained Voronoi grid from the new unconstrained Delaunay triangulation;
    wherein the construction of protected points comprises:
        replacing each point lying on the feature by a mirror image pair of protected points; and
        replacing each point lying on a feature intersection by a set of points placed on a circle which is centered at the intersection.

2. The method of claim 1 wherein the polylines are based on the geometry of the internal features and a given point density distribution.

3. The method of claim 1 wherein the construction of protected points comprises: adjusting, by estimating projections onto the constrained edges of the constrained Delaunay triangulation, whenever a protection edge estimated from the constrained edge does not satisfy Delaunay condition, and adding protected points formed from the projection points.

4. The method of claim 1 further comprising refining the polylines to conform to a given point density distribution.

5. The method of claim 1 wherein radii of said circles are determined based on edge size in the constrained Delaunay triangulation.

6. The method of claim 1 further comprising grid smoothing of the Delaunay triangulation.

7. The method of claim 6 wherein said grid smoothing is based on centroidal Voronoi tessellations.

8. The method of claim 1 further comprising adapting the Delaunay triangulation to a point density distribution.

* * * * *